(12) United States Patent
Leslie

(10) Patent No.: US 9,694,980 B1
(45) Date of Patent: Jul. 4, 2017

(54) SCISSOR ACTION CONTAINER GRIPPER

(71) Applicant: John M. Leslie, Blountville, TN (US)

(72) Inventor: John M. Leslie, Blountville, TN (US)

(*) Notice: Subject to any disclaimer, the term of this patent is extended or adjusted under 35 U.S.C. 154(b) by 0 days.

(21) Appl. No.: 14/998,722

(22) Filed: Feb. 5, 2016

Related U.S. Application Data

(60) Provisional application No. 62/176,025, filed on Feb. 6, 2015.

(51) Int. Cl.
| | |
|---|---|
| B65G 17/26 | (2006.01) |
| B65G 17/12 | (2006.01) |
| B65G 37/00 | (2006.01) |
| B65G 17/32 | (2006.01) |
| B65G 15/14 | (2006.01) |

(52) U.S. Cl.
CPC .......... B65G 17/26 (2013.01); B65G 15/14 (2013.01); B65G 17/12 (2013.01); B65G 17/323 (2013.01); B65G 37/005 (2013.01)

(58) Field of Classification Search
CPC ...... B65G 17/12; B65G 17/26; B65G 17/323; B65G 17/44; B65G 15/14; B65G 37/005
See application file for complete search history.

(56) References Cited

U.S. PATENT DOCUMENTS

| | | | | |
|---|---|---|---|---|
| 3,052,340 | A * | 9/1962 | Lyons | B65B 43/52 198/633 |
| 3,857,478 | A * | 12/1974 | Meeusen | B60P 1/6409 198/690.2 |
| 4,741,432 | A * | 5/1988 | Dekko | B65G 17/12 140/1 |
| 5,429,226 | A * | 7/1995 | Ensch | B65G 17/44 198/803.14 |
| 6,772,876 | B2 * | 8/2004 | Spangenberg | B65G 37/005 198/867.02 |
| 6,851,549 | B1 * | 2/2005 | Beringer | B65G 17/44 198/803.14 |
| 9,205,989 | B1 * | 12/2015 | Leslie | B65G 17/323 |
| 2013/0277176 | A1 * | 10/2013 | Corlett | B65G 17/44 198/626.1 |

* cited by examiner

*Primary Examiner* — Gene Crawford
*Assistant Examiner* — Keith R Campbell

(57) ABSTRACT

A container gripper adapted for mounting on a container carrying (transport) chain of a container processing machine, the gripper body having a body portion with first and second banks of upstanding resilient, elastomeric fingers upstanding thereof, wherein the fingers of the first bank cross over the fingers of the second bank at upper portions of each finger to allow the upper ends of the fingers to contact and grip a container in a scissor-like manner.

3 Claims, 2 Drawing Sheets

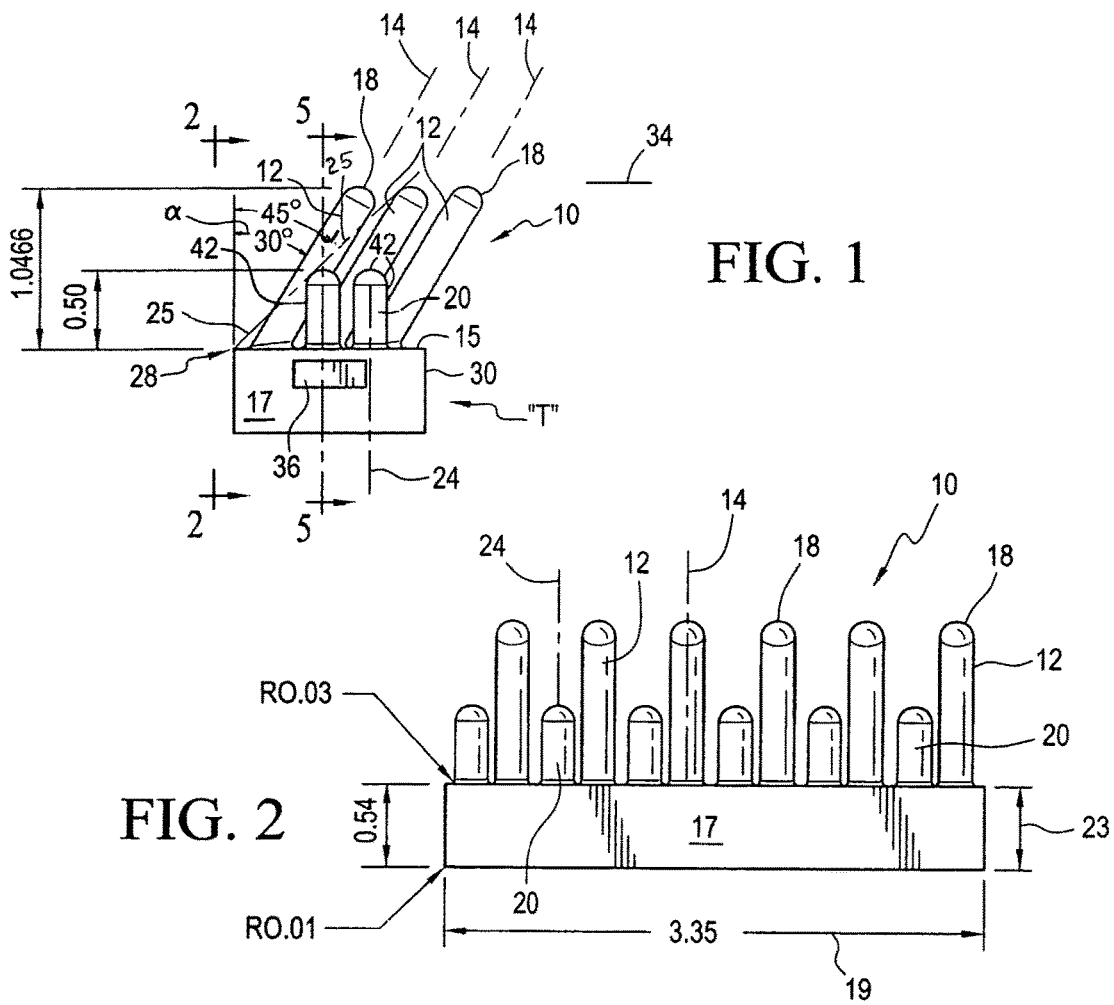
FIG. 1
FIG. 2
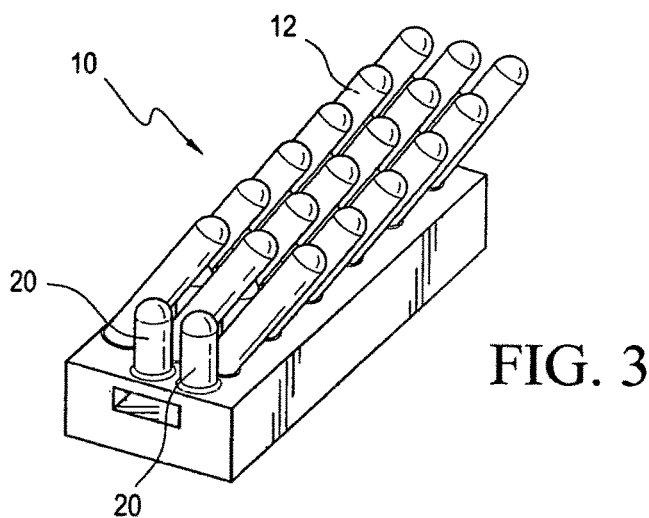
FIG. 3

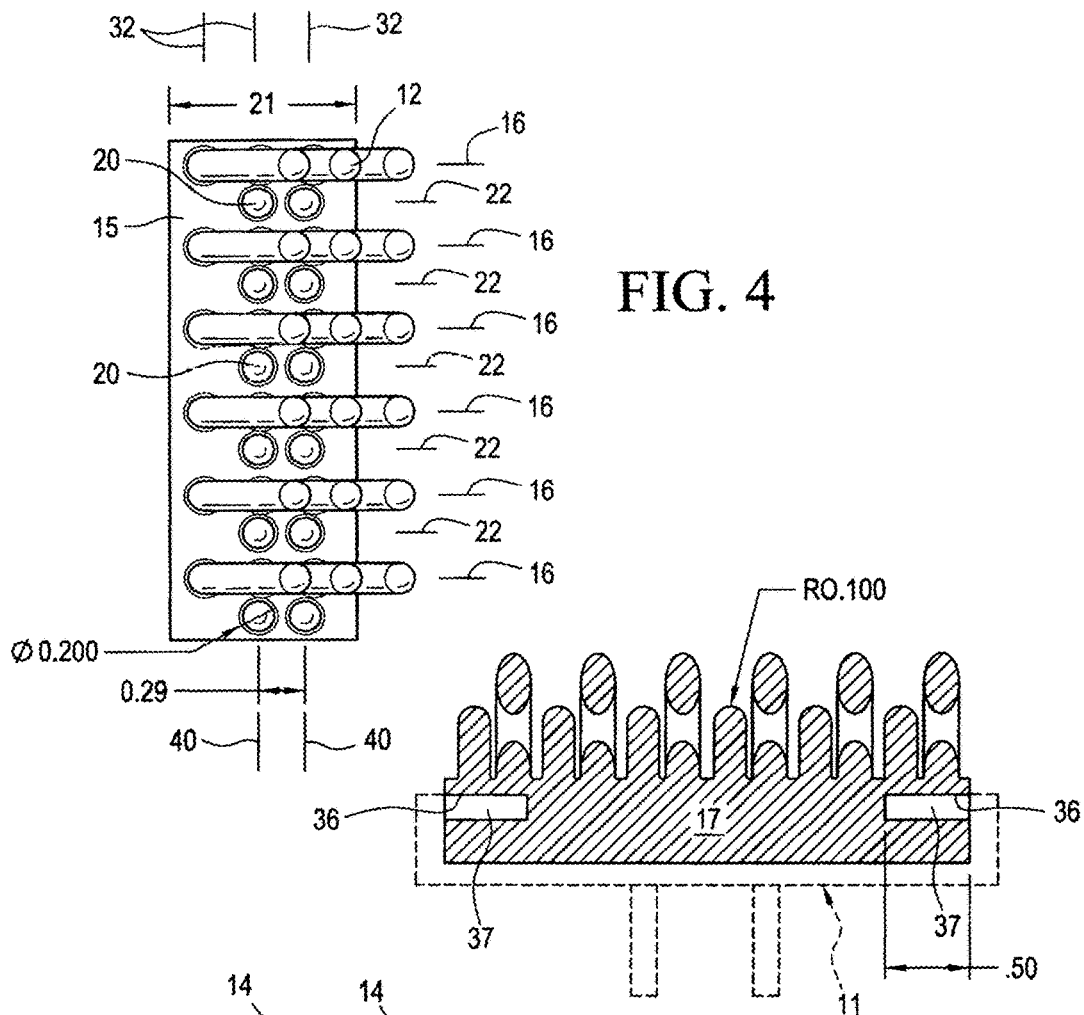
FIG. 4
FIG. 5
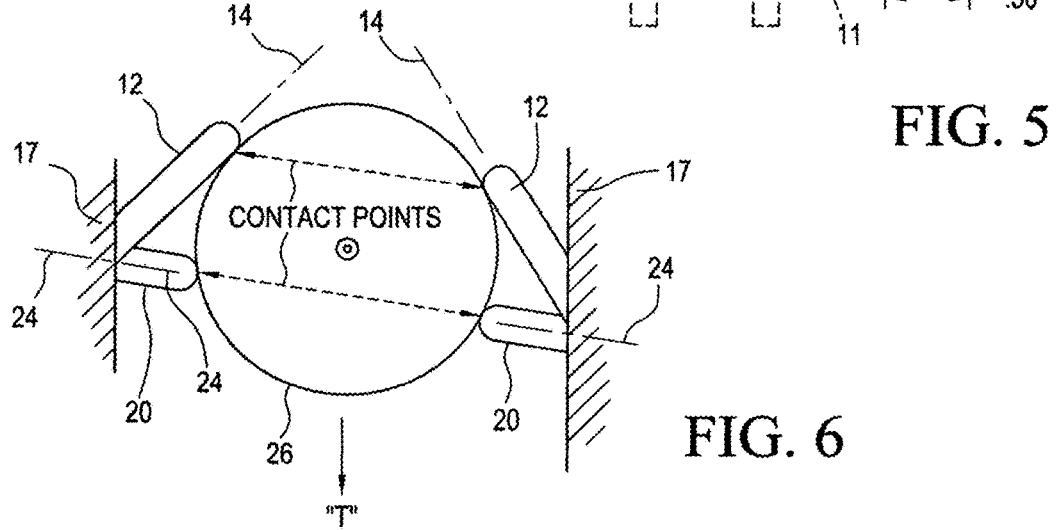
FIG. 6

SCISSOR ACTION CONTAINER GRIPPER

This application claims priority under 35 U.S.C. 119(e)(1) based on Applicants Provisional U.S. Patent Application Ser. No. 62/176,025 filed Feb. 6, 2015 entitled Scissor Action Container Gripper.

This invention is directed to a unique and improved container product gripper for use on a product capturing or clamping conveyor chain wherein parallel chains are typically made up of roller base chain links provided with a snap-on product gripping device. This device usually is connected to each link and comprises a metal or plastic base plate for quick attachment to the link, wherein the plate has a product gripping member of resilient material such as rubber, urethane, elastomer or the like fixed onto the top surface of the base plate. Two such chains typically run on edge and parallel to each other. The products such as liquid containers are picked up in their path by squeezing them between the opposing gripping members as the chains are made to converge.

The chains are able to flex within a plane substantially containing the longitudinal axes of the grippers in order to raise or lower the product being conveyed, and then the two chains separate, thereby setting the products on a conveyor or platform at a different level. See U.S. Pat. Nos. 5,219,065, and 6,851,549, the disclosures of both hereby being incorporated herein by reference in their entireties for the general layout of product capturing chain constructions which could be used commercially with the present gripper.

The present gripper provides enhanced gripping sensitivity and universality of use as well as improved longevity and base flexibility for ease of installation.

SUMMARY OF THE PRESENT INVENTION

A container gripper structure having a body portion with longitudinally extending rows of upstanding resilient first and second container gripper fingers affixed to an upper planar surface of the body, wherein the longitudinal axes of the rows of the first fingers are laterally offset from the longitudinal axes of the rows of second fingers, wherein the first fingers are slanted in a lateral direction, from the planar surface of the body, wherein the second fingers are shorter in length than the first fingers, and wherein the first and second fingers cross each other at upper portions of the fingers to provide a scissor type of grip on a container.

BRIEF DESCRIPTION OF THE DRAWINGS

Referring to the drawings herein wherein exemplary dimensions are given in inches and wherein the Figures show an exemplary full scale operational gripper wherein structural dimensions are given in inches:

FIG. 1 is an end view of a preferred embodiment of the present elastomeric, multi-finger gripper wherein the fingers preferably are solid core, and wherein the direction of travel of the conveyor and present gripper mounted thereon relative to a container to be gripped is designated "T";

FIG. 2 is a side view of the gripper of FIG. 1 taken along line 2-2 of FIG. 1;

FIG. 3 is an isometric view of the gripper;

FIG. 4 is a top plan view of the gripper showing an exemplary and preferred arrangement of the first and second fingers;

FIG. 5 is a leading edge cross-sectional view of the present gripper taken along line 5-5 in FIG. 1, and mounted on a base link shown in dotted line which is adapted for mounting on a container carrying conveyor such as shown in U.S. Pat. No. 5,219,065; and FIG. 6 is a top view of a container 26 showing the position (posture) of the present gripper fingers as the gripper advances into contact with a container in direction "T".

DETAILED DESCRIPTION

The gripper 10 is constructed preferably of thermoplastic elastomeric material such as Santoprene™ 271-55 described in detail in the Exxon Mobil Chemical publication of Mar. 8, 2009, and described in general terms as "A soft, colorable specially thermoplastic vulcanizate (TPV) in the thermoplastic elastomer (TPE) family. It complies with FDA regulations for rubber articles intended for repeated use, as well as those in contact with non-fatty, non-oily foods as closures and sealing gaskets. This grade of Santoprene TPV is shear-dependent and can be processed on conventional thermoplastics equipment for injection molding or extrusion.

It is polyolefin based and completely recyclable."

Referring particularly to FIG. 1, the gripper 10 first fingers 12 have in an exemplary embodiment a flex axes 14 of about 30° with respect to the vertical surface 28 of gripper body portion 17 and are arranged in first lateral rows 16 along longitudinal row axes 32, which axes 32 are coincident with surface 15 and pass through the flex axes 14 of fingers 12 on body 17, the exact number of such rows depending on the particular application (container) for which the gripper is intended. The body portion has a longitudinal dimension 19, a lateral dimension 21, a thickness dimension 23, a leading edge portion 28 and a trailing edge portion 30. The fingers 12 are preferably circular in cross-section and the tops 18 thereof are radiused and lie in a common plane 34.

The second gripper fingers 20 are arranged in second lateral rows 22 along longitudinal row axes 40 and alternate with rows 16 in both a longitudinal and lateral direction and have a substantially vertical flex axes 24. Row axes 40 are also coincident with surface 15 and pass through the flex axes 24 of fingers 20. The first 16 and second 22 lateral rows are attached to body 17 at positions whereby the upper portion of the first and second fingers will cross each other as at 42 in FIG. 1 by way of the angular mounting angle "a" of fingers 12 on body 17 as shown in FIG. 1. When fingers 12 contact a container they will flex rearwardly, e.g., to a posture such as line 25 shown in FIG. 1 which gives about a 15° flex from their at rest posture.

The hardness (durometer), flexibility, resiliency, wear resistance, and the like of the gripper material can, of course, be tailored to meet the needs of the particular application such as, for example, whether the containers are fluid filled, are of thin plastic, or heavy glass bottles or lightweight aluminum empty containers.

Referring to FIG. 6 the unique crossing action of the first and second fingers 12 and 20 in a scissor-like manner affords markedly enhanced gripping of containers 26 which can have a wide variety of circumferences and weights. This action is effected by advancement of the opposing gripper first and second fingers onto opposing sides of the container whereby the fingers 12 are resiliently deformed rearwardly and whereby fingers 20 act as direct stops, or are themselves resiliently slightly deformed but not necessarily rearwardly, and provide further frictional gripping of the container. This action of the second fingers 20 diminishes over deformation of the first fingers 12 and enhances longevity and efficacy of the gripper structure while providing more uniform and stabilizing gripping of the container. Locking tab recesses 36 are formed in the body 17 ends for receiving the locking tabs 37 of a chain link base 11 as shown by dotted line in FIG. 5.

The invention has been described in detail with particular reference to preferred embodiments thereof, but it will be understood that variations and modifications will be effected within the spirit and scope of the invention.

I claim:

1. A container gripper structure of molded elastomeric material for mounting on a base link of a conveyor chain of a container carrying or transport conveyor, said structure comprising a body portion having a longitudinal dimension, a lateral dimension a thickness dimension, a planar upper surface, a leading edge and a trailing edge,
   a first bank of first laterally spaced, parallel longitudinal rows of upstanding resilient first fingers extending upwardly from said upper surface at an angle "α" of about 5° to about 50° from vertical in a trailing direction along a first longitudinally axis of each row, wherein the tops of said first fingers all lie in a common plane,
   said structure further having a second bank of at least one second row of laterally spaced, parallel longitudinal rows of upstanding second-fingers extending upwardly at a substantially right angle from said upper surface along a second longitudinally axis of each row to a shorter length than said first fingers of from about ¼-¾ the length of said first fingers,
   and wherein said second fingers are positioned both laterally and longitudinally between said first fingers,
   and wherein an upper portion of said first fingers crosses said second fingers in a lateral direction at an upper portion of said first and second fingers to provide container contact ends of said fingers which will engage a container side wall in a pinching manner.

2. The gripper structure of claim 1 wherein "α" is about 30° from vertical.

3. The gripper structure of claim 1 wherein said first bank consists of three rows of fingers, wherein said second bank consists of two rows of fingers, and wherein said longitudinal axes (40) of said two rows are offset laterally from said longitudinal axes (32) of said three rows of fingers.

* * * * *